United States Patent [19]

Muller et al.

[11] Patent Number: 5,496,578
[45] Date of Patent: Mar. 5, 1996

[54] STRESS FREE DOUGH SHEETING PROCESS FOR BATCH SYSTEMS

[75] Inventors: Bernardus W. Muller, Loveland; Timothy Mauro-Vetter, Mason, all of Ohio

[73] Assignee: Rykaart, Inc., Hamilton, Ohio

[21] Appl. No.: 339,933

[22] Filed: Nov. 15, 1994

Related U.S. Application Data

[62] Division of Ser. No. 80,070, Jun. 18, 1993, Pat. No. 5,427,515.

[51] Int. Cl.⁶ ............... A21C 11/10; A21C 3/10; A21C 9/08
[52] U.S. Cl. .......... 426/502; 426/503; 426/517; 426/518; 198/418.6; 83/343; 83/369; 83/370; 83/932; 425/102; 425/107; 425/142; 425/145; 425/238; 425/294; 425/297; 425/302.1; 425/315; 425/367; 425/373
[58] Field of Search .................. 426/496, 502, 426/503, 512, 517, 518; 425/96, 102, 107, 142, 145, 238–241, 297–294, 302.1, 305.1, 304, 310, 313, 315, 367, 373, 374, 403, 426; 83/90, 155, 168, 171, 343, 369, 370, 932; 198/418.6

[56] References Cited

U.S. PATENT DOCUMENTS

| | | | |
|---|---|---|---|
| 4,056,346 | 11/1977 | Hayashi | 425/373 |
| 4,192,636 | 3/1980 | Hayashi et al. | 426/502 X |
| 4,276,317 | 6/1981 | Hayashi | 426/502 X |
| 4,583,930 | 4/1986 | Hayashi | 426/502 X |
| 4,676,727 | 6/1987 | Atwood | 425/142 |
| 4,692,107 | 9/1987 | Morikawa et al. | 425/140 |
| 4,877,632 | 10/1989 | Nogmeroles | 425/373 |
| 4,883,417 | 11/1989 | Morikawa et al. | 426/503 X |
| 4,897,030 | 1/1990 | Vajtay | 425/384 |
| 4,902,524 | 2/1990 | Morikawa et al. | 426/503 |
| 4,904,491 | 2/1990 | Morikawa et al. | 426/502 |
| 4,957,426 | 9/1990 | Hayashi | 426/502 X |
| 4,984,677 | 1/1991 | Prakken | 198/418.6 |
| 5,030,466 | 7/1991 | Kageyama et al. | 426/502 |
| 5,039,542 | 8/1991 | Havashi | 426/502 |
| 5,061,507 | 10/1991 | Aulik et al. | 426/504 |
| 5,091,202 | 2/1992 | Hayashi | 426/496 |
| 5,123,830 | 6/1992 | Papalexis | 425/307 |
| 5,158,792 | 10/1992 | Morikawa et al. | 426/503 |
| 5,266,341 | 11/1993 | Morikawa et al. | 425/140 |
| 5,310,569 | 5/1994 | Muller | 426/504 |

FOREIGN PATENT DOCUMENTS

| | | | |
|---|---|---|---|
| 3444085 | 1/1986 | Germany | 425/238 |
| 4320640 | 11/1992 | Japan | 425/238 |
| 93/00817 | 1/1993 | WIPO | 425/240 |
| 93/00819 | 1/1993 | WIPO | 425/240 |

*Primary Examiner*—Donald E. Czaja
*Assistant Examiner*—Milton I. Cano
*Attorney, Agent, or Firm*—Wood, Herron & Evans

[57] ABSTRACT

A method of producing a stress free sheet of dough having uniform height and width can be economically and conveniently used with a batch dough system. Individual dough batches are deposited into a retention hopper from which equal volumetric dough portions are sectioned by a pair of oppositely rotating co-acting cutters. Each cutter includes a number of blades which cooperate with corresponding blades on the opposing cutter to section the dough into portions. The dough portions are deposited onto an inclined conveyor positioned below the hopper so that a leading end of each dough portion overlaps a trailing end of the previous dough portion. A photo-electric detection device ascertains the trailing end of the previous dough portion and signals the cutters to section the next successive dough portion. The overlapping dough portions are then formed into a dough sheet having uniform height and width by a pressing roller and a combination of side guide wedges and side pressing rollers, A second photo-electric detection device is positioned to ascertain an accumulation of dough entering the pressing rollers in order to prevent an excessive accumulation of dough on the upstream side of the pressing rollers, This invention economically produces a stress free sheet of dough with a well developed gluten network from discrete batches of dough.

4 Claims, 4 Drawing Sheets

STRESS FREE DOUGH SHEETING PROCESS FOR BATCH SYSTEMS

This is a division of application Ser. No. 08/080,070, filed Jun. 18, 1993 now U.S. Pat. No. 5,427,515.

BACKGROUND OF THE INVENTION

This invention relates to an apparatus and method for producing a continuous sheet of dough. More particularly, this invention relates to an apparatus and method for producing a continuous sheet of stress free dough of generally uniform height and width from discrete batches of dough.

The current practice for commercially producing sheets of dough by a batch method generally involves measuring the required dry ingredients (i.e., flour, sugar, yeast, etc.) and mixing them with the appropriately measured liquid ingredients (i.e., water, oil, etc.). The resulting dough paste created by mixing these ingredients is then kneaded until the desired dough batch is developed. A gluten network is formed within the dough batch.

The dough batch is typically then transferred to a retention hopper or bin and co-mingled with previously prepared batches of dough. The dough remains in the retention hopper until it is extruded by a combination of peripherally ribbed oppositely rotating discharge rollers which force the dough mass through an extrusion die or restricted opening to form a continuous stream of dough exiting the retention bin. In the course of forcing the dough through the extrusion die, the discharge rollers forcefully pull the dough from the retention hopper and push it through the restricted opening. Once extruded, the stream of dough can be shaped, rolled, or cut to the desired specifications depending upon the ultimate dough product (i.e., croissant, bread loaf, biscuit, pizza dough, etc.).

As the dough is kneaded, the gluten network develops within the dough. The gluten network is a highly elastic and cohesive gel structure which is generally indicative of the quality of the dough. The more developed and undamaged the gluten network remains in the dough, the higher the quality of the resulting dough product. The gluten in the dough is damaged or destroyed as a result of high stresses or shear forces applied to the dough. Therefore, the less stress imparted to the dough or the more "stress free" the dough remains, the higher the quality of the resulting dough product.

In the practice of the above-described commercial process for producing a continuous sheet of dough, the peripherally ribbed discharge rollers which pull the dough from the retention hopper and force it through the extrusion die exert a significant sheer or tearing force upon the dough. These forces greatly damage and destroy the gluten network within the dough. Additionally, the compression forces applied to the dough by the discharge rollers also damage the gluten network. The resulting stream of compressed dough emerging from the retention hopper is difficult to shade and form due to the damaged gluten network.

The damaged dough can be partially restored if passed through a series of rollers and shapers, but this corrective measure is much more timely and costly than if the gluten network had never been damaged in the first place. An additional corrective measure to rehabilitate the damaged gluten common in the industry is to allow the dough to rest for as much as two hours after extrusion from the retention hopper. Once again, this practice serves to only partially regenerate the gluten network and is inherently time consuming and is a further complicating requirement in producing a continuous sheet of quality, stress free dough. The dough, even after rehabilitation, is of a lesser quality and more resistant to shaping than "stress free" dough.

One prior solution for producing a continuous stream of stress free dough is disclosed in U.S. Pat. No. 5,310,569, assigned to the Assignee of this invention. That invention involves continuously mixing the dry and liquid ingredients which are then transferred to a temperature controlled chamber for continuous kneading which generates a continuous stream of dough. The dough stream is discharged from the kneading chamber, without the benefit of rollers or stress inducing extrusion dies, through a discharge conduit of predetermined flow resistance. The resulting stress free continuous dough stream has a well developed and undamaged gluten network. However, the apparatus and method disclosed in that application is directed to a continuous mixer and continuous kneader for forming a continuous dough sheet. There still exists a need for a method and apparatus for producing a continuous sheet of stress free dough for the batch process in which the ingredients are mixed and then kneaded and discrete batches of dough deposited and co-mingled with other batches in the retention hopper. A batch system for producing dough includes a batch mixer in which the dough is mixed and then kneaded. Batch sizes typically vary from as little as 100 pounds to as much as 2,000 pounds per batch.

A method for producing a continuous sheet of dough for the batch process is disclosed in U.S. Pat. No. 4,904,491 in which the dough is severed into portions by horizontal cutter blades positioned at the bottom of a hopper. In this method, the dough is produced in batches which are then deposited into the hopper. The cutter blades section the dough into individual portions which are each then weighed and placed on a conveyor to occupy a space proportional to their weight. The speed of the conveyor is controlled to correspond to the weight of each portion of dough so that each successive portion is positioned on the conveyor to overlap the previous portion, thereby forming a continuous sheet of dough after rolling and shaping. A problem associated with this method is the involved steps of weighing each portion of dough and regulating the conveyor to overlap each portion. These steps complicate the dough sheeting process. Therefore, the cost of such a system to carry out the method disclosed in U.S. Pat. No. 4,904,491 can be a prohibitive factor to using this method.

SUMMARY OF THE INVENTION

It has therefore been an objective of this invention to provide an improved apparatus and method for producing a stress free sheet of dough for use with the batch dough making systems.

It has been a further objective of this invention to provide an apparatus and method for producing a stress free sheet of dough from the batch process which is relatively inexpensive and utilizes existing dough making equipment.

The term "stress free" is used herein to refer to dough which has a well developed and undamaged gluten network requiring no rehabilitative measures to regenerate damaged gluten resulting from excessive forces or pressures applied to the dough. Furthermore, in that the gluten network within the dough is not damaged there is less moisture present with the dough. Less moisture is present because as the gluten network is damaged, water is liberated within the dough. Therefore approximately 50% less flour is required in the transportation and forming of the stress free dough sheet.

These objectives of the invention are attained by a system for producing a stress free sheet of dough in which individual batches of dough are deposited into a retention hopper. The dough mass contained within the retention hopper is then sectioned into approximately equal volumetric portions of dough by a pair of oppositely rotating co-acting cutters. The cutters include a number of blades, each of which cooperates with a corresponding blade on the other cutter to section off a volume of dough from the dough mass in the hopper.

The sectioned dough portions fall by gravity from the cutters to a conveyor positioned therebelow. Frequently, the dough is soft, highly adhesive, and tends to adhere to the blades after it has been sectioned from the dough mass. To assist the dough portions in falling onto the conveyor, each blade has a contoured cross-sectional profile to reduce the tendency for the dough to adhere thereto. Additionally, the cutting blades are coated with a teflon layer to further assist the dough portion in dropping onto the conveyor. Lastly, a spray jet nozzle is positioned to periodically spray a deposit of vegetable oil onto the cutting blades and thereby reduce the friction and adhesion between the blades and the dough portion.

The sectioning of the dough portions from the dough mass is regulated so that the leading end of each dough portion is overlapped on top of a trailing end of the previous dough portion already deposited onto the conveyor. A photo-electric detection device is positioned orthogonally with respect to the conveyor to detect the trailing end of the previous dough portion advancing downstream on the conveyor. Once the trailing end of the previous dough portion is detected, the cutting blades are signaled to section off another dough portion which will be deposited onto the conveyor to overlap the trailing end of the previous dough portion.

In order to maintain the overlapping dough portions in a longitudinally aligned configuration on the conveyor, the conveyor is tilted approximately ten degrees with respect to a horizontal plane so that an upstream end of the conveyor is higher than a downstream end. With the conveyor thusly tilted, the dough portion deposited from the cutters is positioned approximately horizontal with its trailing end resting on the conveyor and its leading end overlapping the previous dough portion. A misalignment is introduced into the overlapped dough portions when they are not deposited horizontally. Therefore, the inclined conveyor allows each dough portion to drop in a generally horizontal orientation and still overlap the previous dough portion thereby minimizing any "kick" or misalignment when the dough portions drop onto the conveyor.

The overlapped dough portions are advanced on the conveyor to be rolled into a sheet of dough having a generally uniform height and width. A pressing roller adjustably positioned above the upper surface of the conveyor forms the series of overlapping dough portions into a generally uniform height sheet of dough. The pressing roller is independently driven to rotate at a speed independent from the speed of the conveyor. When the pressing roller smooths the overlapping regions of dough, an accumulation of dough forms on the upstream side of the pressing roller. To avoid the formation of an excessive accumulation of dough at the pressing roller, a second photo-electric detection device is positioned on the upstream side of the pressing roller to detect the magnitude of the dough accumulation. If the size of the dough accumulation exceeds a predetermined amount, the photo-electric detection device will signal the cutters to cease sectioning dough portions until the dough accumulation has resided to an acceptable level by the rolling action of the pressing roller. Therefore, the production of a stress free sheet of dough according to this invention includes two separate photo-electric detection devices, each of which can independently regulate the sectioning of dough portions.

To form the overlapping dough portions into a uniform width sheet of dough, a wedge is placed between the pressing roller and the upper surface of the conveyor on each lateral side of the overlapped dough portions. A sloped face on the wedge narrows the dough to a predetermined width defined by the spacing between the wedges.

Additionally, side rollers independently contour and form the side edges of the dough sheet. The side rollers can be positioned in a variety of locations at a position downstream relative of the pressing roller. A side roller is positioned for each lateral side of the dough sheet and includes a motor rotating a downwardly projecting drive shaft. A cylinder is eccentrically secured to the drive shaft to include an offset between the major axis of the drive shaft and the major axis of the cylinder. A sleeve is retained around the circumference of the cylinder and is capable of friction free rotation with respect to the cylinder. The outer circumference of the sleeve contacts the side edge of the advancing dough sheet to thereby form the lateral side edge into a more uniform configuration.

The cylinder rotates in an orbit about the eccentrically mounted drive shaft. During the portion of the orbit proximate the side edge of the dough sheet, the sleeve contacts the side edge to thereby form it into a consistent and uniform configuration. The sleeve rotates with the advancing dough sheet when in contact therewith and rotates with the orbiting cylinder when not in contact with the dough sheet.

BRIEF DESCRIPTION OF THE DRAWINGS

The objectives and advantages of the present invention will become more readily apparent from the following detailed description taken in conjunction with the accompanying drawings in which.

DETAILED DESCRIPTION OF THE INVENTION

Figure 1:
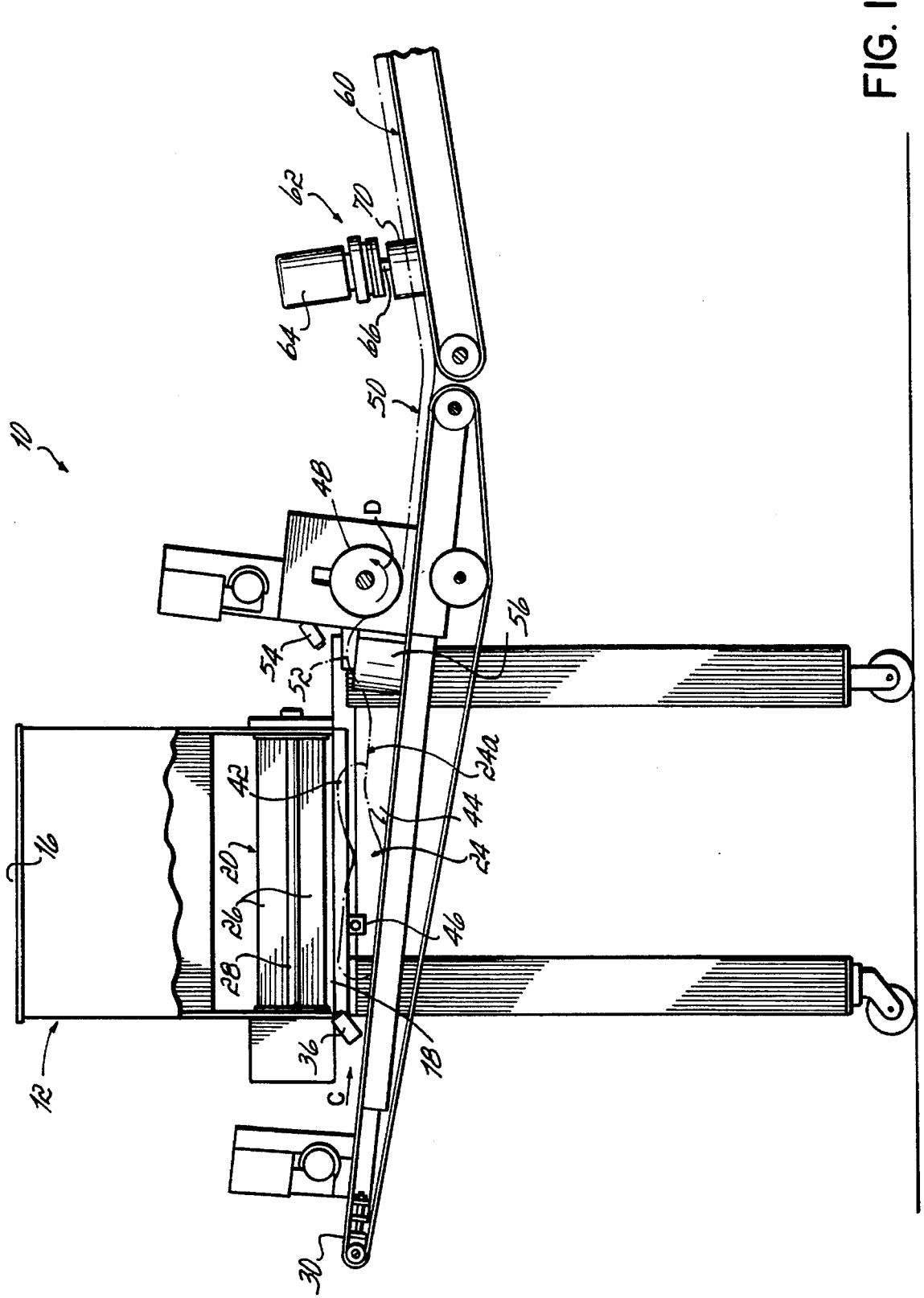
FIG. 1 is a side elevational view of an apparatus for producing a stress free sheet of dough according to this invention.

An apparatus 10 for producing a stress free continuous dough sheet of uniform width and height is shown in FIG. 1. The apparatus 10 includes a retention hopper 12 containing a large dough mass 14. The retention hopper 12 preferably is capable of containing approximately 100 gallons of dough and includes a top opening 16 and a bottom opening 18. Discrete batches (not shown) of dough are deposited into the hopper 12 through the top opening 16 and co-mingled with previous batches of dough already in the hopper 12 to form the dough mass 14. By gravity, the dough mass 12 settles to the bottom of the hopper 12 toward the bottom opening 18.

A pair of oppositely rotating cutters 20 are positioned immediately below the hopper 12 at the bottom opening 18. The cutters 20 are rotationally driven in opposite directions by a motor 22 geared to the cutters 20 in order to section off a portion 24 of the dough mass 14 positioned between the cutters 20. The cutters 20 are preferably driven from the same motor 22 and are interconnected by gearing or a chain drive (not shown) in order to avoid any variation in rotational velocity between the two cutters 20.

Figure 3:
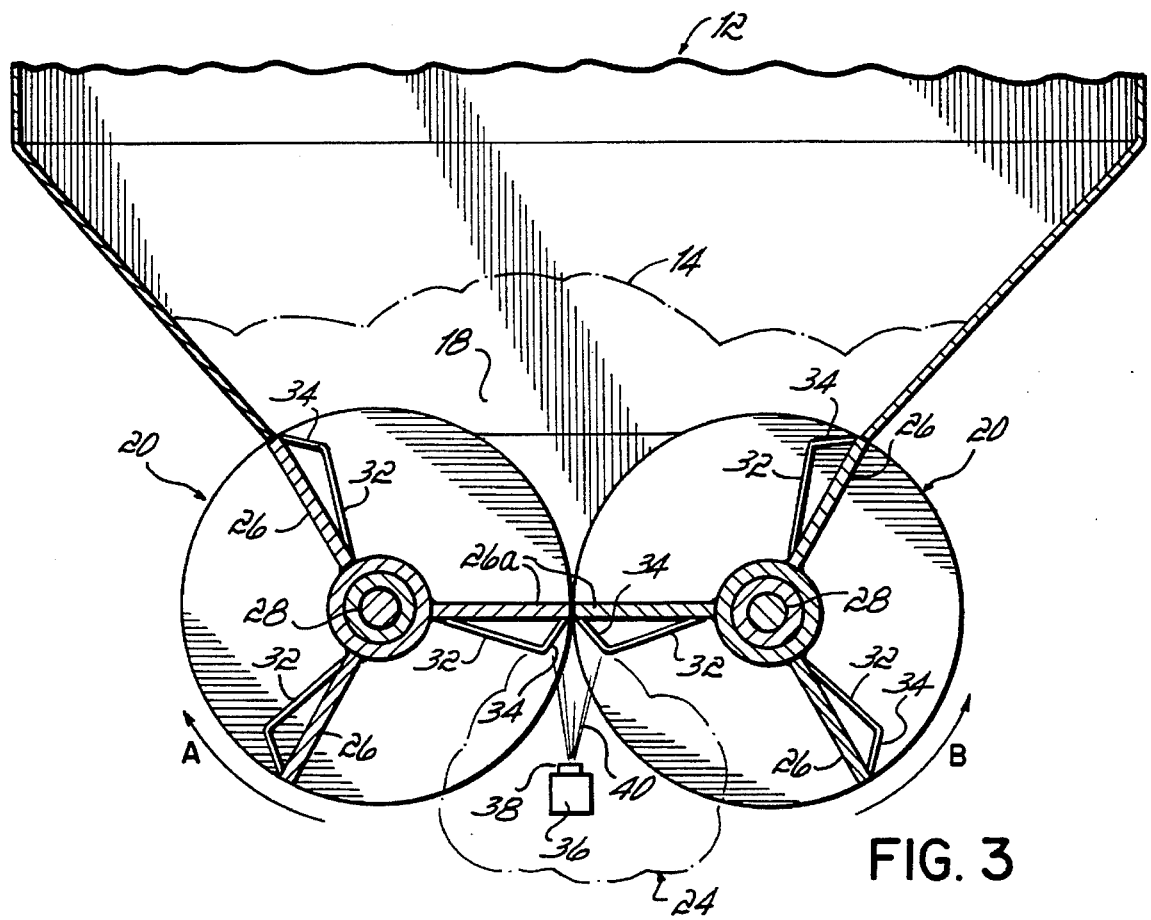
FIG. 3 is an enlarged cross-sectional view of cutting blades sectioning a portion of dough from a dough mass in the retention hopper of the apparatus of FIG. 1.
Figure 4:
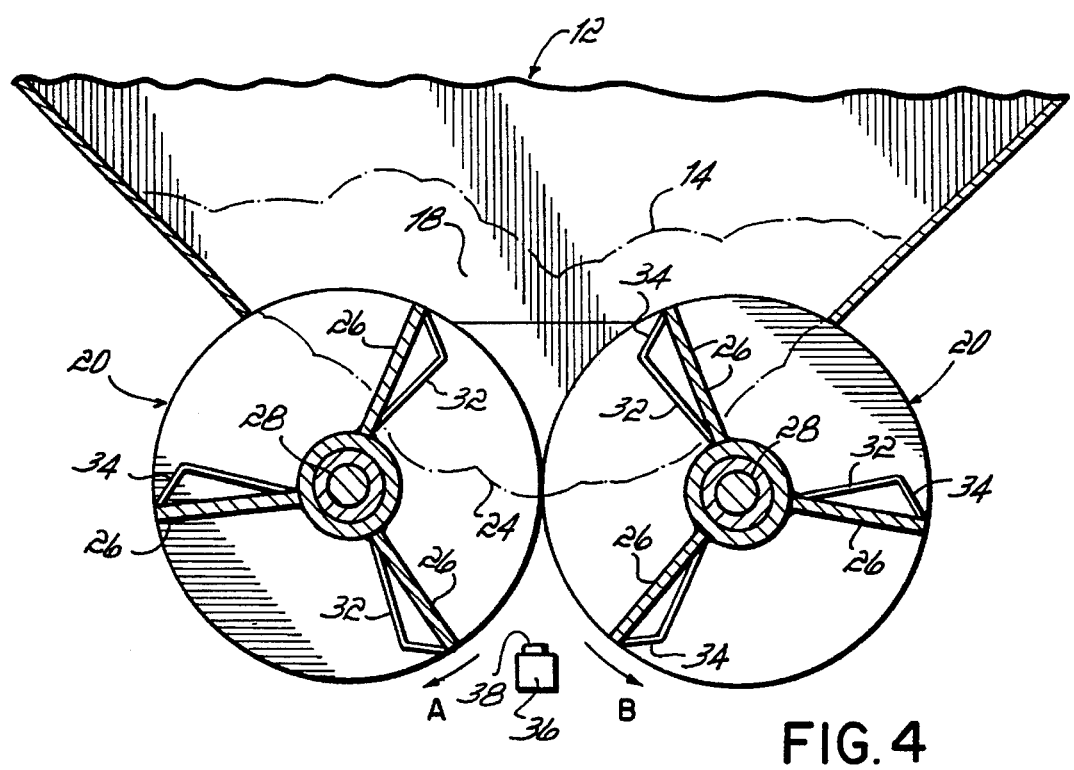
FIG. 4 is a view similar to FIG. 3 with the cutting blades rotating in opposite directions relative to each other.

Each cutter 20 includes three blades 26 which extend radially outward at 60 degree intervals from a major shaft 28 of the cutter 20 as shown in FIGS. 3 and 4. The cutting blades 26 are preferably about 3 feet long and are coated with a teflon layer (not shown). The cutters 20 are aligned with respect to each other so that corresponding blades 26a on each cutter 20 are positioned on a line extending between the shafts 28 of the cutters 20 when sectioning a dough portion 24 (FIG. 3). As a result, when the cutters 20 are rotationally driven in opposite directions as shown by arrows A and B, the portion 24 of the dough mass 14 positioned between corresponding blades 26 on each cutter 20 is sectioned from the dough mass 14. With the cutters 20 of the present invention, approximately equal volumetric dough portions 24 are successively sectioned from the dough mass 14, The cutters 20 of this invention are designed to section off generally equal volume dough portions, preferably approximately 1000 cubic inches +/−55 cubic inches per dough portion. The weight of each dough portion is approximately 38 to 42 pounds. However, the weight of each dough portion 24 is dependent upon the composition and specification for the particular dough to be used in the process whereas the volume of each portion is generally substantially constant.

After being sectioned from the dough mass 14, each dough portion 24 drops by gravity from the cutters 20 to an inclined conveyor 30 positioned immediately below the cutters 20 (FIG. 1). If the dough portion 24 is especially soft and adhesive, it will tend to adhere to the blades 26 of the cutters 20 and not fall to the inclined conveyor 30. Therefore, each cutting blade 26 has a contoured surface 32 or profile in order to assist the dough portion in separating from the surface 32 of the cutting blade (FIGS. 3 and 4). The cross sectional profile of each cutting blade surface 32 is contoured to include a triangular configuration in which an apex 34 of the triangle is directed downwardly toward the conveyor belt 30. The downwardly projecting contour 32 of the cutting blade 26 promotes the separation of the dough portion 24 from the cutting blade 26 as seen in FIG. 3. Furthermore, to enhance the separation of the dough portion 24 from the cutting blade 26, the teflon coating on each blade reduces the friction and adhesion between the dough portion 26 and the cutting blade 26.

Additionally, a spray jet 36 with a nozzle 38 is directed toward the cutting blades 26 to spray a deposit vegetable oil 40 onto the surface 32 of the blades 26. The deposit of oil 40 further decreases the adhesion and friction between the surface 32 of the cutting blades 26 and the dough portion 24 thereby aiding the separation of the dough portion 24 from the cutters 20. Preferably, the vegetable oil 40 is mixed with compressed air for atomization and sprayed onto each blade 26 on alternate revolutions of the cutter 20.

Figure 2:
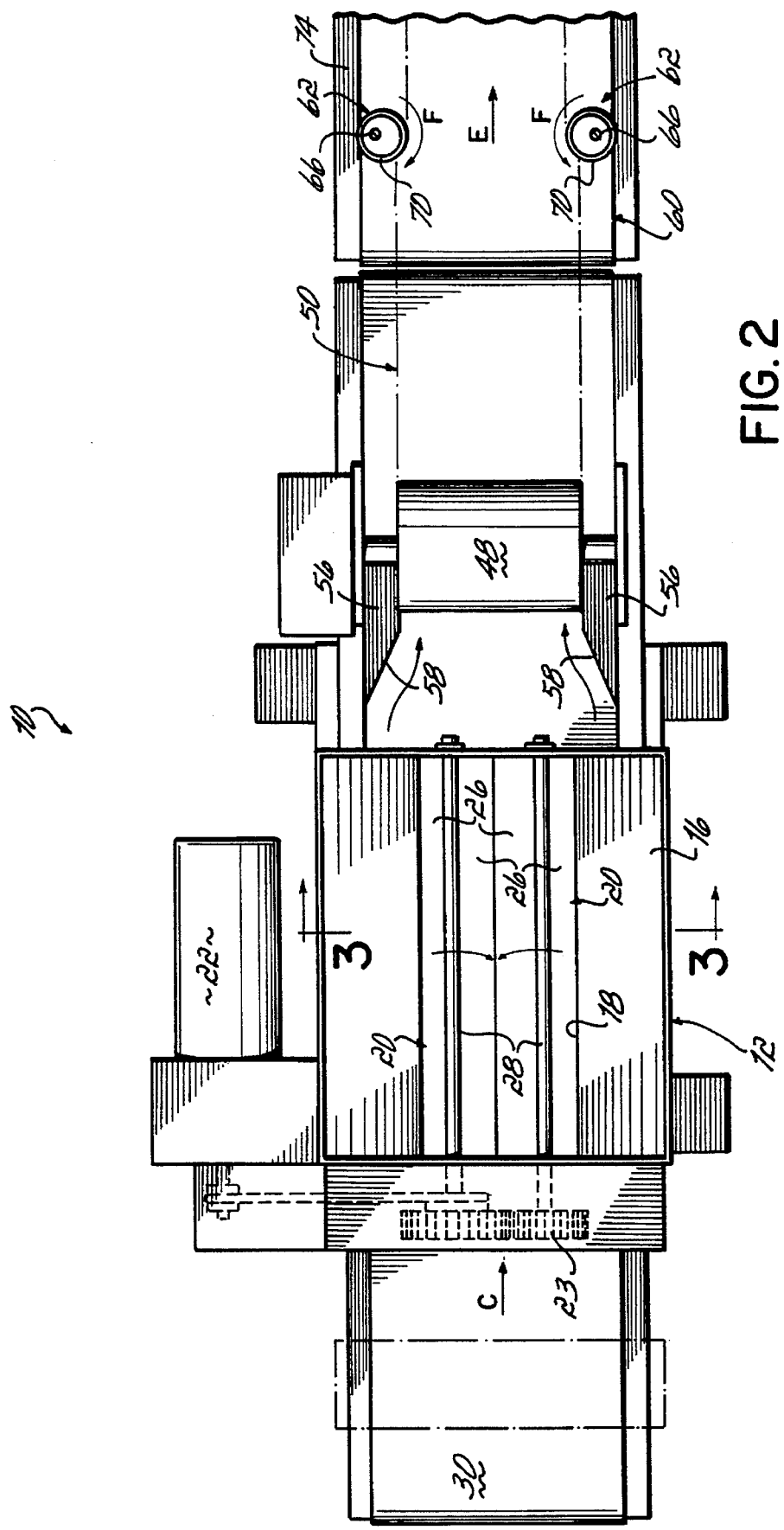
FIG. 2 is a lop plan view of the apparatus of FIG. 1.

The conveyor 30 advances the dough portion 24 deposited from the cutters 20 in a downstream direction as shown by Arrow C in FIG. 2. The dough portion 24 is deposited onto the conveyor 30 so that a leading downstream end 42 of each dough portion 24 is overlapped on top of a trailing upstream end 44 of a previous dough portion 24a. The conveyor 30 of the present invention is angled approximately ten degrees with respect to a horizontal plane with the upstream end of the conveyor positioned above the downstream end of the conveyor. The conveyor 30 is angled so that each dough portion 24 is deposited onto the conveyor 30 and the previous dough portion 24a in a generally horizontal or flat configuration thereby minimizing any tendency for the dough portion 24 to be misaligned or skewed with respect to the series of overlapped dough portions. The dough portion 24 tends to skew with respect to the previous dough portion 24a if the leading end 42 contacts the previous dough portion 24a before the trailing end 44 contacts the conveyor 30. The tilted conveyor 30 enables both ends 42, 44 of the dough portion 24 to contact approximately simultaneously.

The operation of the cutters 20 and the timing of the sectioning of a dough portion 24 to enable it to overlap in the appropriate relationship with respect to the previous dough portion 24a is accomplished by a photo-electric detection device 46 positioned orthogonally with respect to the conveyor 30. The photo-electric detection device 46 is directed to have a field of view covering the conveyor 30 below the cutters 20. The detection device 46 is positioned to detect the trailing end 44 of the previous dough portion 24a on the conveyor 30 as it advances in the downstream direction. Once the detection device 46 discerns the trailing end 44 of the previous dough portion 24a, the detection device signals 46 the cutters 20 to section off the next portion of dough 24 to be deposited onto the conveyor 30 to overlap the previous dough portion 24a. As a result, the dough portions 24 are systematically and sequentially positioned on the conveyor 30 to serially overlap the previous dough portion 24a without the need for the involved steps of weighing and calculating the appropriate length on the conveyor belt required for the particular dough section.

The series of overlapping dough portions are advanced on the conveyor 30 toward a pressing roller 48 positioned above and spaced from the upper surface of the conveyor 30. The height of the pressing roller 48 is adjustable with respect to the upper surface of the conveyor 30 permitting a range of dough sheet heights. The pressing roller 48 shapes the overlapped portions of dough into a dough sheet 50 having a uniform height. The pressing roller 48 is rotationally driven, preferably independently from the conveyor 30 in the direction of arrow D. The pressing roller 48 is preferably independently driven from the conveyor 30 in order to accommodate an accumulation of dough 52 which forms on the upstream side of the pressing roller 48. The pressing roller 48 forces the accumulation of dough 52 into the dough sheet 50 formed between the pressing roller 48 and the conveyor 30 by having a higher rotational velocity than the translational velocity of the conveyor 30.

The accumulation of dough 52 which forms on the upstream side of the pressing roller 48 is discerned by a second photo-electric detection device 54 positioned above the pressing roller 48. The detection device 54 ascertains the height or magnitude of the accumulation of dough 52 entering the pressing roller 48. If the accumulation 52 exceeds a predetermined level, the detection device 54 signals the cutters 20 to cease sectioning dough portions 24 until the pressing roller 48 has reduced the accumulation of dough 52 by processing it into the dough sheet 50. The photo-electric detection devices 46, 54 of this invention are preferably standard, off-the-shelf hardware requiring no specialized modifications for this application.

Once the accumulation of dough 52 subsides below a predetermined maximum level, the detection device 54 signals the cutters 20 to resume the sectioning of dough portions 24. Therefore, the cutters 20 of this invention continue to section dough portions 24 provided that the signals from both detection devices 46, 54 are positive thereby indicating that the trailing end 44 of the previous dough portion 24a has been detected and that the accumulation of dough 52 at the upstream side of the pressing roller 48 is below a predetermined magnitude.

The width of the dough sheet 50 is uniformly shaped with a pair of guide wedges 56 positioned on the upstream side of the pressing roller 48 between the pressing roller 48 and the conveyor 30 as shown in FIG. 2. A guide wedge 56 is positioned on each lateral side of the overlapped dough portions and includes a sloped face 58 to thereby narrow and form the overlapping dough portions between the guide wedges 56 into a uniform width dough sheet 50.

Figure 5:
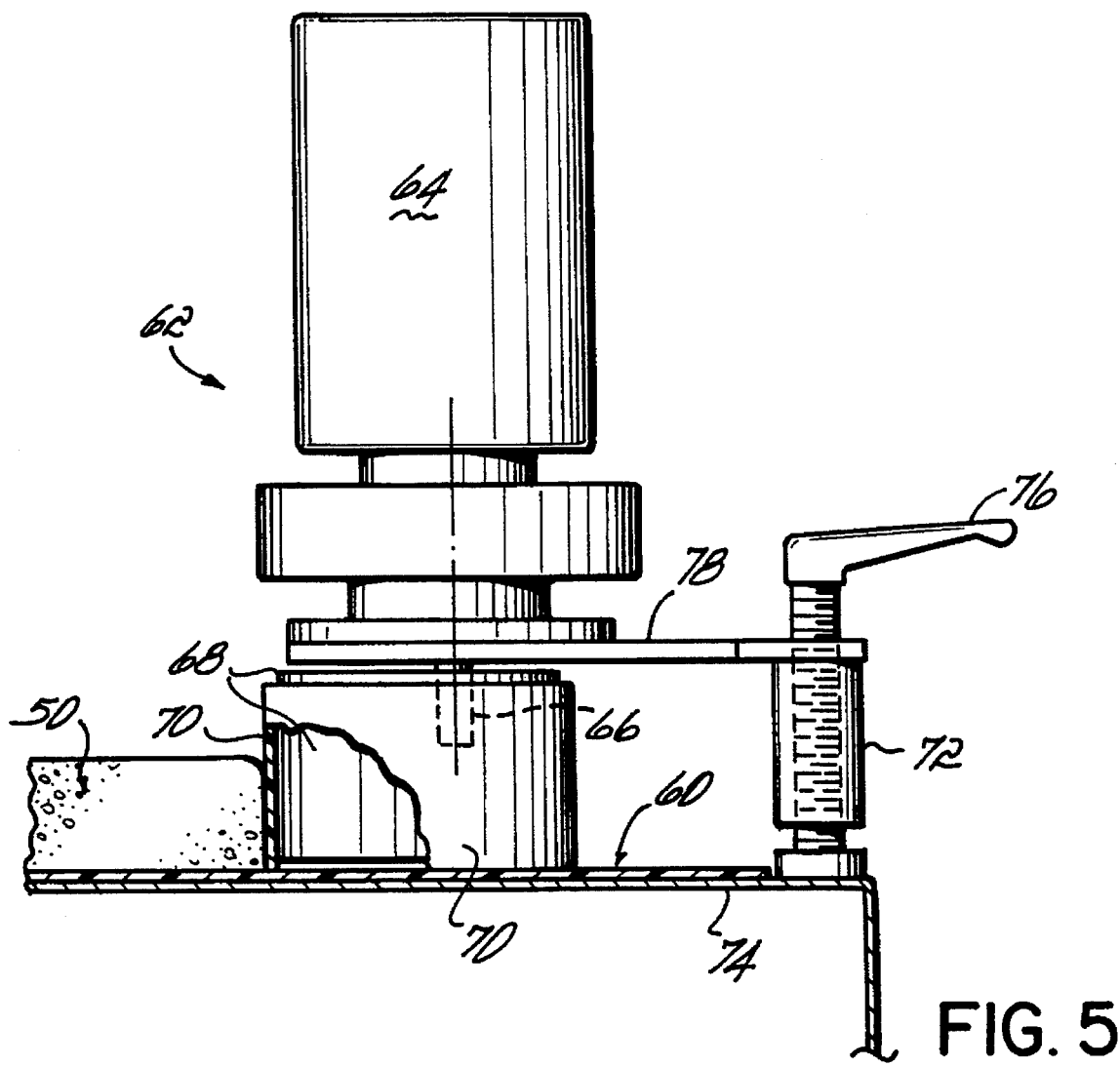
FIG. 5 is a side elevational view of a side pressing roller forming the lateral edge of the dough sheet.

Once the dough sheet 50 is formed to a uniform height and width, it is transferred from the conveyor 30 to a second conveyor 60 for transfer to the appropriate cutting and shaping stations (not shown) as required depending on the particular dough product being produced. As a part of the shaping and processing of the dough sheet 50, side pressing rollers 62 can be used to refine and contour the configuration of the side edges of the dough sheet 50 and to further reduce the dough sheet width. The side pressing rollers 62 are positioned on each lateral side edge of the dough sheet 50 and include a motor and a rotational drive shaft 66 projecting downwardly from the motor 64 (FIG. 5). The rotating drive shaft 66 is eccentrically mounted within a cylinder 68 with approximately a 0.8 inch offset between major axes of the cylinder 68 and the drive shaft 66. The motor 64 rotates the cylinder 68 in an orbit about the drive shaft 66. A sleeve 70 is retained around the outer circumference of the cylinder 68. The sleeve 70 is preferably constructed of polyvinylchloride (PVC) and the cylinder 68 from a UHMW polyethylene in order to create minimal friction between the sleeve 70 and the cylinder 68 thereby allowing the sleeve 70 to rotate freely with respect to the cylinder 68. A mounting brace 72 secures the side roller 62 to a conveyor table 74. The mounting brace 72 includes a handle 76 for releasing the side roller 62 and pivoting the side roller 62 about a link arm 78 and away from the dough sheet 50 for maintenance and other required operations.

The sleeve 70 around the cylinder 68 contacts the side edge of the dough sheet 50 moving preferably a maximum of ten feet per minute on the conveyor 30 in the direction of Arrow E (FIG. 2). The motor 64 preferably rotates the drive shaft 66 and the cylinder 68 approximately 130 revolutions per minute in the direction of Arrow F. As the dough sheet 50 advances past the side roller 62, the sleeve 70 contacts the side edge of the dough sheet 50 when the orbit of the cylinder 68 approaches the dough sheet 50 to thereby contour and reform the dough sheet 50 into a uniform width. The interaction between the sleeve 70 and the cylinder 68 has minimal friction thereby permitting the sleeve 70 to rotate relative to the cylinder 68 when in contact with the advancing dough sheet 50. However, the sleeve 70 rotates with the cylinder 68 in the orbit about the drive shaft 66 when it is not in contact with the advancing dough sheet 50. As a result, the side pressing rollers 62 reform the side edges of the advancing dough sheet 50 without imparting excessive stress or gluten damaging pressures thereto. It will be appreciated by one of ordinary skill in the art that the side pressing rollers 62 of this invention can be used either in conjunction with or independent from the present invention apparatus 10 for producing the stress free dough sheet.

From the above disclosure of the general principles of the present invention and the preceding detailed description of the preferred embodiment, those skilled in the art will readily comprehend the various modifications to which the present invention is susceptible. Therefore, we desire to be limited only by the scope of the following claims and equivalents thereof.

We claim:

1. A process for producing a continuous sheet of dough, said process comprising the steps of:

preparing a mass of dough;

sectioning said dough mass into portions of dough, said dough portions being generally of equal volumes;

placing said dough portions serially on a conveyor;

regulating said sectioning and said placing such that a leading end of each said dough portion overlaps a prior dough portion, said regulating including a detection device being positioned to detect a trailing end of each said dough portion on said conveyor, said detection device preventing the sectioning of a subsequent dough portion until said trailing end has been detected to thereby overlap each said dough portion on said conveyor onto a previous dough portion; and forming said overlapping dough portions into a dough sheet of uniform height.

2. The process of claim 1 wherein said sectioning comprises a pair of cooperating oppositely rotating cutters, each said cutter having a plurality of blades, co-acting blades on each of said cutters sectioning said dough portions from said dough mass.

3. The process of claim 2 further comprising:

spraying a deposit of oil onto said cutters to assist said placing of said dough portions onto said conveyor.

4. A process for producing a continuous sheet of dough, said process comprising the steps of:

preparing a mass of dough, sectioning said dough mass into portions of dough, said dough portions being generally of equal volumes;

placing said dough portions serially on a conveyor;

regulating said sectioning and said placing such that a leading end of each said dough portion overlaps a prior dough portion;

forming said overlapping dough portions into a dough sheet of substantially uniform height; and said regulating including a detection device being positioned to detect an accumulation of said overlapped dough portions entering said forming step, said detection device preventing said sectioning of subsequent dough portions until said accumulation of dough has passed through said forming step.

* * * * *